Dec. 26, 1961 W. J. KALLIO 3,014,386
DRILL
Filed Sept. 3, 1957
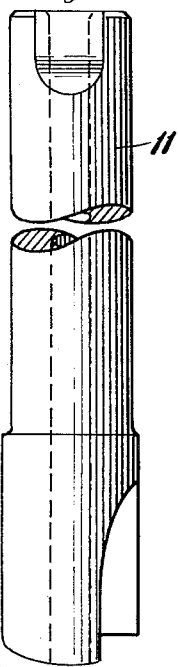
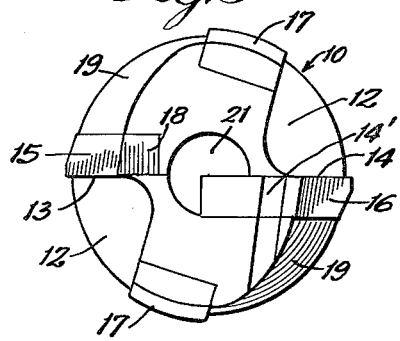
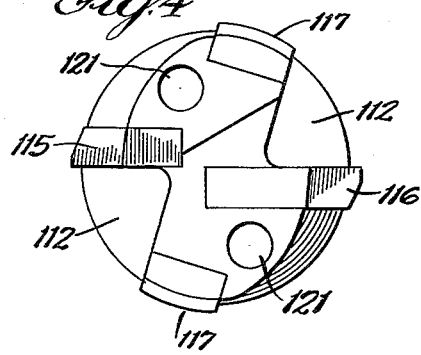
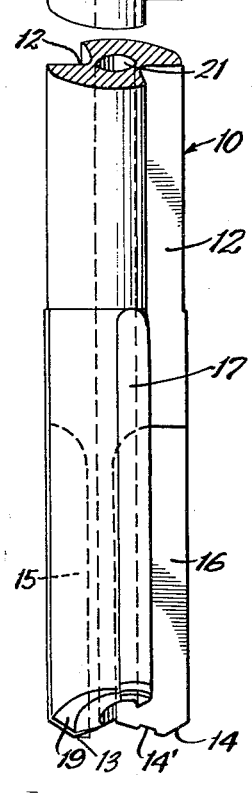
INVENTOR:
William J. Kallio,
BY Bair, Freeman & Molinare
ATTORNEYS.

3,014,386
DRILL

William J. Kallio, Glen Ellyn, Ill., assignor to United-Greenfield Corporation, Chicago, Ill., a corporation of Delaware
Filed Sept. 3, 1957, Ser. No. 681,498
1 Claim. (Cl. 77—68)

This invention relates to drills and more particularly to rotary cutting drills for drilling metal, wood, plastic, and the like.

In conventional twist drills, the point produces a cutting and scraping action which is very inefficient and which is impractical for steel cutting drills tipped with tungsten carbide or like hard cutting materials. Some of the objections to a twist drill are overcome by the so-called "gun drill" which has a single flute and a single cutting edge extending radially inward from the periphery of the drill tip and which may easily be tipped with tungsten carbide or the like. Gun drills are, however, inherently unbalanced with the result that the hole tends to be bell mouthed and the tool tends to whip and vibrate. This results in rapid breakdown of the cutting edge and inefficient operation.

It is one of the objects of the present invention to provide a drill which is relatively easy and inexpensive to manufacture, which cuts with greater efficiency than conventional twist or gun drills and which is balanced in operation to eliminate whip, vibration and bell mouthed holes.

Another object is to provide a drill having two spaced cutting edges, one of which terminates at a point spaced from the drill axis and the other of which extends to the drill axis to remove all of the stock.

According to a feature of the invention, the cutting edges are formed on separate inserts of hard material mounted so that the cutting edges lie in the same diametral plane.

A further object is to provide a drill formed with an axial bore for the flow of cutting fluid and in which one cutting edge terminates outside of the bore while the other cutting edge extends into the bore to the axis of the drill body.

The above and other objects and features of the invention will be more readily apparent from the following description when read in connection with the accompanying drawing, in which:

FIGURE 1 is an elevation of a drill with parts broken away;

FIGURE 2 is an axial sectional view through a drilled piece showing the shape of the bottom of the hole;

FIGURE 3 is an end view of the drill of FIGURE 1; and

FIGURE 4 is a view similar to FIGURE 3 of a modified construction.

The drill, as shown in FIGURES 1 and 3, comprises an elongated drill body indicated generally at 10 terminating at one end in a shank 11 by which the drill may be mounted. The body terminates in a cutting tip at its opposite end and is formed with diametrically opposite chip flutes 12. As shown, the chip flutes 12 extend axially of the body although it will be understood that helical chip flutes could be provided, if desired.

At the cutting tip of the drill a pair of cutting edges 13 and 14 are provided which lie at the trailing sides of the chip flutes with respect to the direction of rotation of the drill during cutting which is counter-clockwise, as seen in FIGURE 3. The cutting edges are preferably formed on inserts 15 and 16 of hard material, such as tungsten carbide, which are secured in recesses in the drill body and extend completely to the cutting tip of the drill, as best seen in FIGURE 1. Wear strips 17 of the same or other wear resistant material may be secured to the body at the leading sides of the chip flutes to center the drill body accurately and so to guide the cutting edges as to produce an accurate straight hole.

As best seen in FIGURE 3, the insert 15 is relatively narrow radially of the body and terminates at its inner edge at a point 18 spaced radially outward from the axis of the body. The insert 16 is substantially wider than the insert 15 and extends completely to and preferably slightly across the axis of the body, as shown in FIGURE 3. The inserts are so mounted that the cutting edges 13 and 14 lie in the same diametral plane so that maximum efficiency of cutting is obtained at all times.

The cutting edges of the inserts 15 and 16 are ground into a V-shape, as seen in FIGURE 1, and the tip of the body behind the cutting edges is relieved, as indicated at 19. The drill will therefore cut, as shown in FIGURE 2, an opening having an annular V-section bottom with minimum variation in depth across the bottom of the opening.

The cutting action of the opposed cutting edges 13 and 14 will be approximately balanced if they are of the same configuration. For exact balance, the inner portion of the short cutting edge 13 radially inward of the peak of the V may be given a flatter angle than the corresponding portion of the longer cutting edge 14. Alternatively or in addition, the longer cutting edge 14 may be notched or grooved as shown at 14' in a portion thereof registering radially with an active part of the cutting edge 13. By using either or both of these means the cutting load on the edges 13 and 14 may be exactly balanced.

In order to supply cutting fluid to the cutting surfaces of the drill the body is preferably formed with an axial bore 21 extending completely to the cutting tip through which cutting fluid can be forced during drilling. As seen in FIGURE 3, the insert 15 terminates outside of the bore 21 while the insert 16 extends into the bore to the axis of the drill body. In this way, cutting fluid forced through the bore 21 has adequate passage and is supplied to the drill tip directly at the cutting edges for maximum effectiveness. Any desired cutting fluid may be used such as liquid coolants or lubricants or gas such as $CO_2$ and is preferably supplied at sufficient pressure to evacuate the chips or cuttings as they are formed along the flutes.

In use of the drill, as so far described, each of the cutting edges will cut at a true radius and at diametrically opposite sides so that the drill is effectively balanced. The cutting edge 13 cuts inward from the circumference of the cutting tip to the point 18 and tends to leave a central rod portion in the central part of the opening. However, since the insert 16 provides a cutting edge 14 extending completely to the axis of the drill body, it will cut out all of the stock to leave a completely open bore. It will furthermore be noted that with this construction utilizing separate inserts 15 and 16 the mounting of the inserts is relatively simple and no complex point construction is required.

In the modified construction of FIGURE 4 wherein parts corresponding to like parts in FIGURES 1 and 3 are indicated by similar reference numerals, plus 100, the axial bore 21 is replaced by a pair of bores 121 formed in the lands of the drill between the chip flutes 112. In this construction the coolant or lubricant will be supplied through both of the bores 121 to the tip of the drill and the operation will otherwise be the same as that of FIGURES 1 to 3. The construction of FIGURES 1 to 3 is somewhat simpler and is preferred for most drill sizes, although the construction of FIGURE 4 may be utilized more effectively on smaller diameter drills which do not have sufficient material for a single axial bore of effective size.

While two embodiments of the invention have been shown and described herein, it will be understood that they are illustrative only and not to be taken as a definition of the scope of the invention, reference being had for this purpose to the appended claim.

What is claimed is:

A drill comprising an elongated body terminating at one end in a cutting tip, a pair of diametrically opposite chip flutes extending along the body to the cutting tip, a pair of V shaped cutting edges at the end of the cutting tip lying at the trailing sides of the chip flutes, one of the cutting edges terminating radially outward from the axis of the drill body and the other cutting edge extending to the axis of the drill body, said other cutting edge being interrupted between its inner and outer ends to balance the cutting load on the two edges.

References Cited in the file of this patent

UNITED STATES PATENTS

| | | |
|---|---|---|
| 2,186,725 | Hughes | Jan. 9, 1940 |
| 2,252,168 | Creighton | Aug. 12, 1941 |
| 2,606,464 | Fleischer | Aug. 12, 1952 |
| 2,898,786 | Willingham | Aug. 11, 1959 |

FOREIGN PATENTS

| | | |
|---|---|---|
| 452,750 | Great Britain | Aug. 28, 1936 |

OTHER REFERENCES

Star Cutter Co. Catalog, Dec. 27, 1955. (Copy in Div. 58.)

"Training for Victory—Drilling Technique," Tool and Die Journal, November 1943; page 5 of the Training Section.